United States Patent
Abukawa et al.

(10) Patent No.: US 12,503,743 B2
(45) Date of Patent: Dec. 23, 2025

(54) HOT-ROLLED STEEL SHEET

(71) Applicant: NIPPON STEEL CORPORATION, Tokyo (JP)

(72) Inventors: Genki Abukawa, Tokyo (JP); Hiroshi Shuto, Tokyo (JP); Kenta Morisawa, Tokyo (JP); Shohei Yabu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/425,251

(22) PCT Filed: Mar. 5, 2020

(86) PCT No.: PCT/JP2020/009382
§ 371 (c)(1),
(2) Date: Jul. 22, 2021

(87) PCT Pub. No.: WO2020/184372
PCT Pub. Date: Sep. 17, 2020

(65) Prior Publication Data
US 2022/0090228 A1 Mar. 24, 2022

(30) Foreign Application Priority Data
Mar. 11, 2019 (JP) .................. 2019-043961

(51) Int. Cl.
*C21D 9/46* (2006.01)
*C21D 1/02* (2006.01)
(Continued)

(52) U.S. Cl.
CPC ............. *C21D 9/46* (2013.01); *C21D 1/02* (2013.01); *C21D 8/0226* (2013.01);
(Continued)

(58) Field of Classification Search
CPC .......... C21D 9/46; C21D 1/02; C21D 8/0226; C21D 8/0263; C21D 8/0278;
(Continued)

(56) References Cited

U.S. PATENT DOCUMENTS

2011/0079328 A1 4/2011 Yokoi et al.
2011/0315279 A1* 12/2011 Kaneko ............. C23C 2/06
148/333

(Continued)

FOREIGN PATENT DOCUMENTS

JP 11-77108 A 3/1999
JP 2000-140930 A 5/2000
(Continued)

OTHER PUBLICATIONS

JP-2006316301-A; Bib Data and Translation; Kikuchi S et al; Nov. 2006 (Year: 2006).*
(Continued)

Primary Examiner — Michael E. La Villa
(74) Attorney, Agent, or Firm — Birch, Stewart, Kolasch & Birch, LLP

(57) ABSTRACT

A hot-rolled steel sheet includes, as a chemical composition, by mass %: C: 0.030% to 0.250%; Si: 0.05% to 2.50%; Mn: 1.00% to 4.00%; Sol. Al: 0.001% to 2.000%; P: 0.100% or less; S: 0.0200% or less; N: 0.01000% or less; Ti: 0% to 0.20%; Nb: 0% to 0.20; B: 0% to 0.010%; V: 0% to 1.0%; Cr: 0% to 1.0%; Mo: 0% to 1.0%; Cu: 0% to 1.0%; Co: 0% to 1.0%; W: 0% to 1.0%; Ni: 0% to 1.0%; Ca: 0% to 0.01%; Mg: 0% to 0.01%; REM: 0% to 0.01%; Zr: 0% to 0.01%; and a remainder of Fe and impurities, in which an area ratio of a scale damage portion, which is a portion lower than an average height of a surface of the steel sheet by 10 μm or more, is 20% or less, and a tensile strength of the sheet is 780 MPa or more.

10 Claims, 2 Drawing Sheets

(51) Int. Cl.

| | | |
|---|---|---|
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/10* | (2006.01) | |
| *C22C 38/12* | (2006.01) | |
| *C22C 38/14* | (2006.01) | |
| *C22C 38/16* | (2006.01) | |
| *C22C 38/26* | (2006.01) | |
| *C22C 38/28* | (2006.01) | |
| *C22C 38/34* | (2006.01) | |
| *C22C 38/38* | (2006.01) | |
| *C22C 38/44* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/58* | (2006.01) | |

(52) U.S. Cl.
CPC ......... *C21D 8/0263* (2013.01); *C21D 8/0278* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/34* (2013.01); *C22C 38/38* (2013.01); *C22C 38/44* (2013.01); *C22C 38/48* (2013.01); *C22C 38/50* (2013.01); *C22C 38/52* (2013.01); *C22C 38/54* (2013.01); *C22C 38/58* (2013.01); *C21D 2211/002* (2013.01); *C21D 2211/005* (2013.01); *C21D 2211/008* (2013.01)

(58) Field of Classification Search
CPC ........ C21D 2211/002; C21D 2211/005; C21D 2211/008; C22C 38/001; C22C 38/002; C22C 38/005; C22C 38/02; C22C 38/04; C22C 38/06; C22C 38/08; C22C 38/10; C22C 38/12; C22C 38/14; C22C 38/16; C22C 38/26; C22C 38/28; C22C 38/34; C22C 38/38; C22C 38/44; C22C 38/48; C22C 38/50; C22C 38/52; C22C 38/54; C22C 38/58

See application file for complete search history.

(56) References Cited

U.S. PATENT DOCUMENTS

| | | | |
|---|---|---|---|
| 2013/0319582 A1* | 12/2013 | Yokoi | C22C 38/38 148/333 |
| 2014/0007993 A1* | 1/2014 | Nakajima | C22C 38/06 148/331 |
| 2018/0106758 A1 | 4/2018 | Yang et al. | |
| 2019/0309396 A1 | 10/2019 | Kizu et al. | |

FOREIGN PATENT DOCUMENTS

| | | | | |
|---|---|---|---|---|
| JP | 2001-334306 A | | 12/2001 | |
| JP | 2002346610 A | * | 12/2002 | |
| JP | 2005-296973 A | | 10/2005 | |
| JP | 2006316301 A | * | 11/2006 | |
| JP | 2007211334 A | * | 8/2007 | |
| JP | 2014-118592 A | | 6/2014 | |
| JP | 2015-98629 A | | 5/2015 | |
| JP | 6179584 B2 | | 8/2017 | |
| KR | 20130075989 A | * | 7/2013 | C22C 38/44 |
| WO | 2009/145328 A1 | | 12/2009 | |
| WO | 2017/189871 A1 | | 10/2017 | |

OTHER PUBLICATIONS

Mill Scale; Corrosionpedia.com; https://www.corrosionpedia.com/definition/780/mill-scale; Jun. 22, 2018 (Year: 2018).*
Translation JP-2002346610-A; Anraku T et al; Dec. 3, 2002 (Year: 2002).*
Translation—JP-2007211334-A; Kikuchi S; Aug. 23, 2007—(Note See IDS dated Jul. 22, 2021 for original document) (Year: 2007).*
Translation—KR 20130075989-A; Song Byoung Jun ; Jul. 8, 2013 (Year: 2013).*
Yamazaki et al., "Influence of Microstructure on Bendability of Ultrahigh-Strength Steel Sheet—Formability of Ultrahigh-Strength Steel Sheet I-", Journal of the JSTP, 1995, vol. 36, No. 416, total 4 pages.

* cited by examiner

HOT-ROLLED STEEL SHEET

TECHNICAL FIELD OF THE INVENTION

The present invention relates to a high strength hot-rolled steel sheet having excellent bending workability.

Priority is claimed on Japanese Patent Application No. 2019-43961, filed Mar. 11, 2019, the content of which is incorporated herein by reference.

RELATED ART

A so-called hot-rolled steel sheet manufactured by hot rolling is a relatively inexpensive structural material and is widely used as a material for a structural member of a vehicle or an industrial device. In particular, a hot-rolled steel sheet used for a suspension component, a bumper component, a shock absorbing member, or the like of a vehicle is being subjected to high-strengthening from the viewpoints of weight reduction, durability, shock absorbing capacity, and the like, is also required to have excellent formability to withstand forming into a complex shape.

However, since the formability of the hot-rolled steel sheet tends to decrease with high-strengthening of the material, it is a difficult task to achieve both high-strengthening and good formability.

Particularly in recent years, there has been an increasing demand for a reduction in the weight of a suspension component of a vehicle, and it has become an important issue to realize strength as high as a tensile strength of 780 MPa or more and excellent bending workability.

Non-Patent Document 1 reports that bending workability is improved by controlling a structure into a single structure such as ferrite, bainite, and martensite through structure control.

Furthermore, Patent Document 1 reports that bending workability is improved by forming ferrite having excellent bending workability as a primary phase and combining suppressing the occurrence of a crack by reducing the surface roughness of a steel sheet and suppressing the propagation of the crack by fine precipitates. Patent Document 2 reports a technique for improving bending workability by causing the hardness of the surface layer of a steel sheet to be lower than that of the center portion of the steel sheet.

Patent Document 3 reports a hot-rolled steel sheet having a predetermined chemical composition and a sheet thickness of 3 to 15 mm, in which the area ratio of points where surface defects caused by scale are generated is 20% or less, a yield stress YP (L) in a rolling direction and a yield stress YP (C) in a width direction are both 400 MPa or more, and YP (L) and YP (C) satisfy |YP (C)−YP (L)|/YP (C)≤0.04.

PRIOR ART DOCUMENT

Patent Document

[Patent Document 1] Japanese Patent No. 6179584
[Patent Document 2] Japanese Unexamined Patent Application, First Publication No. 2015-98629
[Patent Document 3] Japanese Unexamined Patent Application, First Publication No. 2014-118592

Non-Patent Document

Non-Patent Document 1: Yamazaki et al., Journal of the Japan Society for Technology of Plasticity), vol. 36 (1995), No. 416, p. 973

DISCLOSURE OF THE INVENTION

Problems to be Solved by the Invention

However, in the techniques reported in Patent Documents 1 and 2 and Non-Patent Document 1, there are cases where it is difficult to achieve both tensile strength and bending workability. Furthermore, in Patent Document 3, although the area ratio of points where surface defects caused by scale are generated is set to 20% or less, since the conditions of a finish rolling step are not satisfied and the steel sheet is subjected to levelling, the area ratio of portions lower than the average height of the surface of the steel sheet by 10 μm or more exceeds 20%, resulting in inferior bending workability.

Therefore, an object of the present invention is to provide a high strength hot-rolled steel sheet having excellent tensile strength and bending workability.

Means for Solving the Problem (1) A hot-rolled steel sheet according to an aspect of the present invention includes, as a chemical composition, by mass %: C: 0.030% to 0.250%; Si: 0.05% to 2.50%; Mn: 1.00% to 4.00%; Sol. Al: 0.001% to 2.000%; P: 0.100% or less; S: 0.0200% or less; N: 0.01000% or less; Ti: 0% to 0.20%; Nb: 0% to 0.20; B: 0% to 0.010%; V: 0% to 1.0%; Cr: 0% to 1.0%; Mo: 0% to 1.0%; Cu: 0% to 1.0%; Co: 0% to 1.0%; W: 0% to 1.0%; Ni: 0% to 1.0%; Ca: 0% to 0.01%; Mg: 0% to 0.01%; REM: 0% to 0.01%; Zr: 0% to 0.01%; and a remainder consisting of Fe and impurities, in which an area ratio of a scale damage portion, which is a portion lower than an average height of a surface of the steel sheet by 10 μm or more, is 20% or less, and a tensile strength of the hot-rolled steel sheet is 780 MPa or more.

(2) The hot-rolled steel sheet according to (1), an average aspect ratio of the scale damage portion may be 5 or less.

(3) The hot-rolled steel sheet according to (1) or (2) may include at least one selected from the group consisting of, as the chemical composition, by mass %: Ti: 0.001% to 0.20%; Nb: 0.001% to 0.20%; B: 0.001% to 0.010%; V: 0.005% to 1.0%; Cr: 0.005% to 1.0%; Mo: 0.005% to 1.0%; Cu: 0.005% to 1.0%; Co: 0.005% to 1.0%; W: 0.005% to 1.0%; Ni: 0.005% to 1.0%; Ca: 0.0003% to 0.01%; Mg: 0.0003% to 0.01%; REM: 0.0003% to 0.01%; and Zr: 0.0003% to 0.01%.

Effects of the Invention

According to an embodiment of the present invention, it is possible to obtain a hot-rolled steel sheet having excellent tensile strength as high as 780 MPa or more and 1470 MPa or less and excellent bending workability with which the occurrence of a bend inside crack can be suppressed.

EMBODIMENTS OF THE INVENTION

Figure 1:
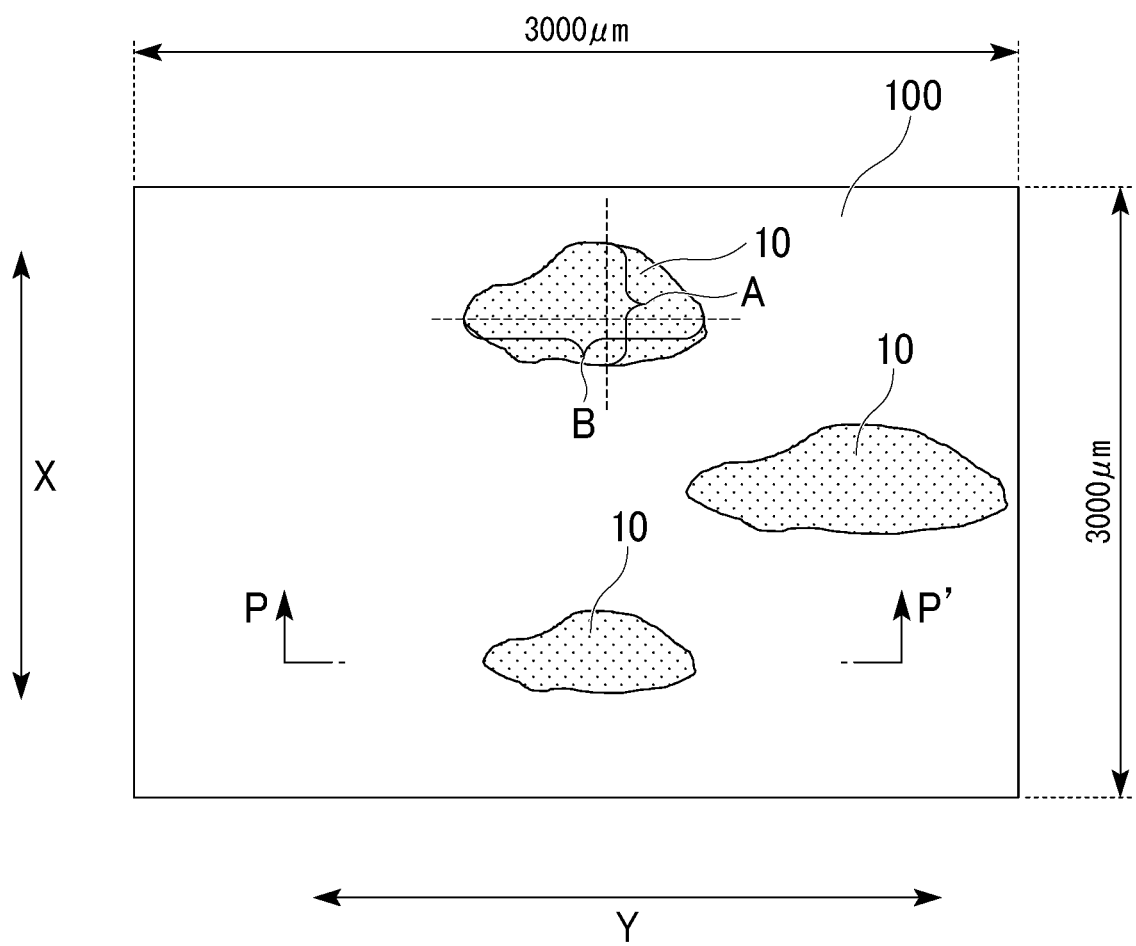
FIG. 1 is a schematic view in a case where the sheet surface of a hot-rolled steel sheet according to the present embodiment is viewed in a plan view.

Hereinafter, a hot-rolled steel sheet according to an embodiment of the present invention will be described in detail. However, the present invention is not limited to the configuration disclosed in the present embodiment, and various modifications can be made without departing from the gist of the present invention. Furthermore, a numerical range described below includes a lower limit and an upper limit in the range. Numerical values indicating "more than" or "less than" do not fall within the numerical range. "%" regarding the amount of each element means "mass %".

First, the findings of the present inventors who came up with the present invention will be described.

In the related art, regarding a crack during bending of a steel sheet, a crack generally occurs from the surface of the steel sheet on the outside of a bend or in the vicinity of an end surface. However, with high-strengthening of a steel sheet, a minute crack may occur on the inside of a bend. Findings in the related have not shown a method of suppressing such a minute crack that occurs on the inside of a bend.

The present inventors intensively investigated the bending workability of a high strength steel sheet, and found that as the strength of the steel sheet increases, a crack is likely to occur from the inside of a bend during bending (hereinafter, referred to as a bend inside crack).

The mechanism of the bend inside crack is presumed as follows. During bending, compressive stress is generated inside the bend. At first, working proceeds while the entire inside of the bend is uniformly deformed. However, as the working amount increases, the deformation cannot be carried only by the uniform deformation, and the deformation progresses with local concentration of strain (generation of a shear deformation band).

As this shear deformation band further grows, a crack occurs along the shear band from the surface of the inside of the bend and grows. It is presumed that the reason why the bend inside crack is more likely to occur with high-strengthening is that uniform deformation is less likely to proceed due to a decrease in work hardening ability caused by the high-strengthening, biased deformation is likely to occur, and a shear deformation band is generated at an early stage of working (or under loose working conditions).

According to the research by the present inventors, it could be seen that a bend inside crack is likely to occur in a steel sheet having a tensile strength of 780 MPa class or higher, becomes more significant in a steel sheet of 980 MPa class or higher, and become a more significant problem in a steel sheet of 1180 MPa class or higher.

From the above presumption process of the occurrence of the bend inside crack, the present inventors considered that suppressing local concentration of strain at an initial stage leads to the suppressing occurrence of a crack, and intensively searched for the suppression method. As a result, it was discovered that local concentration of strain at an initial stage is associated with the surface properties of a steel sheet, and it was found that a bend inside crack can be suppressed by controlling the surface properties.

The present inventors also found an effective hot rolling method for obtaining the surface properties. It was discovered that a phenomenon that surface layer scale is pressed into a steel sheet by rolls during hot rolling has a great influence on the final surface properties, and it was found that it is important to control the growth of scale during hot rolling in order to control the surface properties, and this can be achieved by spraying water onto the surface of the steel sheet during rolling under certain conditions.

1. Chemical Composition

Hereinafter, the composition of the hot-rolled steel sheet according to the present embodiment will be described in detail. The hot-rolled steel sheet according to the present embodiment contains base elements as a chemical composition, optional elements as necessary, and the remainder consisting of Fe and impurities.

(C: 0.030% or More and 0.250% or Less)

C is an important element for securing the strength of the steel sheet. When the C content is less than 0.030%, a tensile strength of 780 MPa or more cannot be secured. Therefore, the C content is set to 0.030% or more, and preferably 0.050% or more.

On the other hand, when the C content exceeds 0.250%, the weldability deteriorates. Therefore, the upper limit thereof is set to 0.250%. The C content is preferably 0.200% or less, and more preferably 0.150% or less.

(Si: 0.05% or More and 2.50% or Less)

Si is an important element for increasing the material strength through solid solution strengthening. When the Si content is less than 0.05%, the yield strength decreases. Therefore, the Si content is set to 0.05% or more. The Si content is preferably 0.10% or more, and more preferably 0.30% or more.

On the other hand, when the Si content exceeds 2.50%, the surface properties deteriorate. Therefore, the Si content is set to 2.50% or less. The Si content is preferably 2.00% or less, and more preferably 1.50% or less.

(Mn: 1.00% or More and 4.00% or Less)

Mn is an element effective in increasing the mechanical strength of the steel sheet. When the Mn content is less than 1.00%, a tensile strength of 780 MPa or more cannot be secured. Therefore, the Mn content is set to 1.00% or more. The Mn content is preferably 1.50% or more, and more preferably 2.00% or more.

On the other hand, when Mn is excessively added, the structure becomes non-uniform due to Mn segregation, and the bending workability decreases. Therefore, the Mn content is set to 4.00% or less, preferably 3.00% or less, and more preferably 2.60% or less.

(sol. Al: 0.001% or More and 2.000% or Less)

Al is an element having an action of deoxidizing steel to achieve soundness of the steel sheet. When the sol. Al content is less than 0.001%, deoxidation cannot be sufficiently achieved. Therefore, the sol. Al content is set to 0.001% or more. However, in a case where sufficient deoxidation is required, it is more desirable to add 0.010% or more of sol. Al. The sol. Al content is even more preferably 0.020% or more.

On the other hand, when the sol. Al content exceeds 2.000%, the weldability is significantly decreased, oxide-based inclusions are increased in amount, and the surface properties are significantly deteriorated. The sol. Al content is set to 2.000% or less, preferably 1.500% or less, more preferably 1.000% or less, and most preferably 0.080% or less. In addition, sol. Al does not form an oxide such as $Al_2O_3$ but means an acid-soluble Al that is soluble in an acid.

The hot-rolled steel sheet according to the present embodiment contains impurities as the chemical composition. The "impurities" indicate those that are incorporated from ore or scrap as a raw material or from a manufacturing environment when steel is industrially manufactured. For example, the impurities mean elements such as P, S, and N. These impurities are preferably limited as follows in order to sufficiently exhibit the effects of the present embodiment. In addition, since the amount of the impurities is preferably small, it is not necessary to limit the lower limit, and the lower limit of the impurities may be 0%.

(P: 0.100% or Less)

P is an impurity generally contained in steel, but has an action of increasing the tensile strength. Therefore, P may be positively contained. However, when the P content exceeds 0.100%, the weldability is significantly deteriorated. Therefore, the P content is limited to 0.100% or less. The P content is preferably limited to 0.050% or less. In order to obtain the effect of the above action more reliably, the P content may be set to 0.001% or more.

(S: 0.0200% or Less)

S is an impurity contained in steel, and the smaller the amount, the more preferable it is from the viewpoint of weldability. When the S content exceeds 0.0200%, the weldability is significantly decreased, the amount of MnS precipitated is increased, and the low temperature toughness decreases. Therefore, the S content is limited to 0.0200% or less. The S content is limited to preferably 0.0100% or less, and more preferably 0.0050% or less. From the viewpoint of desulfurization cost, the S content may be set to 0.0010% or more.

(N: 0.01000% or Less)

N is an impurity contained in steel, and the smaller the amount, the more preferable it is from the viewpoint of weldability. In particular, when the N content exceeds 0.01000%, the weldability is significantly decreased. Therefore, the N content may be limited to 0.01000% or less, and preferably 0.00500% or less.

The hot-rolled steel sheet according to the present embodiment may contain optional elements in addition to the base elements and impurities described above. For example, instead of a portion of Fe in the remainder described above, Ti, Nb, B, V, Cr, Mo, Cu, Co, W, Ni, Ca, Mg, REM, and Zr may be contained as the optional elements. These optional elements may be contained according to the purpose. Therefore, it is not necessary to limit the lower limits of these optional elements, and the lower limits thereof may be 0%. In addition, even if these optional elements are contained as impurities, the above effects are not impaired.

(Ti: 0% or More and 0.20% or Less)

Ti is an element that precipitates as TiC in ferrite or bainite in the structure of the steel sheet during cooling and coiling of the steel sheet, and thus contributes to an improvement in strength. When the Ti content exceeds 0.20%, the above effects are saturated and the economic efficiency is lowered. Therefore, the Ti content is set to 0.20% or less. The Ti content is preferably 0.18% or less, and more preferably 0.15% or less. In order to obtain the above effects preferably, the Ti content may be 0.001% or more. The Ti content is preferably 0.02% or more.

(Nb: 0% or More and 0.20% or Less)

Nb, like Ti, is an element that precipitates as NbC to improve the strength, significantly suppresses the recrystallization of austenite, and thus refines the grain size of ferrite. When the Nb content exceeds 0.20%, the above effects are saturated and economic efficiency is lowered. Therefore, the Nb content is set to 0.20% or less. The Nb content is preferably 0.15% or less, and more preferably 0.10% or less. In order to obtain the above effects preferably, the Nb content may be 0.001% or more. The Nb content is preferably 0.005% or more.

In addition, the hot-rolled steel sheet according to the present embodiment preferably contains, as the chemical composition, by mass %, at least one of Ti: 0.001% or more and 0.20% or less or Nb: 0.001% or more and 0.20% or less.

(B: 0% or More and 0.010% or Less)

B segregates at the grain boundaries to improve the grain boundary strength, thereby suppressing the roughness of a punched cross section during punching. Therefore, B may be contained. Even if the B content exceeds 0.010%, the above effects are saturated, which is economically disadvantageous. Therefore, the upper limit of the B content is set to 0.010% or less. The B content is preferably 0.005% or less, and more preferably 0.003% or less. In order to obtain the above effects preferably, the B content may be 0.001% or more.

(V: 0% or More and 1.0% or Less), (Cr: 0% or More and 1.0% or Less), (Mo: 0% or More and 1.0% or Less), (Cu: 0% or More and 1.0% or Less), (Co: 0% or More and 1.0% or Less), (W: 0% or More and 1.0% or Less), and (Ni: 0% or More and 1.0% or Less)

V, Cr, Mo, Cu, Co, W, and Ni are all elements that are effective in securing stable strength. Therefore, these elements may be contained. However, even if each of the elements is contained in an amount of more than 1.0%, the effect of the above action is likely to be saturated, which may be economically disadvantageous. Therefore, it is preferable that the V content, the Cr content, the Mo content, the Cu content, the Co content, the W content, and the Ni content are each set to 1.0% or less. In order to obtain the effect of the above action more reliably, at least one of V: 0.005% or more, Cr: 0.005% or more, Mo: 0.005% or more, Cu: 0.005% or more, Co: 0.005% or more, W: 0.005% or more, or Ni: 0.005% or more is preferably contained.

(Ca: 0% or More and 0.01% or Less), (Mg: 0% or More and 0.01% or Less), (REM: 0% or More and 0.01% or Less), (Zr: 0% or More and 0.01% or Less)

Ca, Mg, REM, and Zr are all elements that contribute to inclusion control, particularly fine dispersion of inclusions, and have an action of enhancing toughness. Therefore, one or two or more of these elements may be contained. However, when any of the elements is contained in an amount of more than 0.01%, there are cases where deterioration of the surface properties becomes apparent. Therefore, the amount of each element is preferably set to 0.01% or less. In order to obtain the effect of the above action more reliably, the amount of at least one of these elements is preferably set to 0.0003% or more.

Here, REM refers to a total of 17 elements including Sc, Y, and lanthanoids, and is at least one thereof. The REM content means the total amount of at least one of these elements. Lanthanoids are added in the form of mischmetal in industry.

In addition, it is preferable that the hot-rolled steel sheet according to the present embodiment contains at least one of, as the chemical composition, by mass %: Ca: 0.0003% or more and 0.01% or less; Mg: 0.0003% or more and 0.01% or less; REM: 0.0003% or more and 0.01% or less; or Zr: 0.0003% or more and 0.01% or less.

The above-mentioned steel composition may be measured by a general steel analysis method. For example, the steel composition may be measured using inductively coupled plasma-atomic emission spectrometry (ICP-AES). In addition, C and S may be measured using a combustion-infrared absorption method, N may be measured using an inert gas fusion-thermal conductivity method, and O may be measured using an inert gas fusion-non-dispersive infrared absorption method.

2. Surface Properties

Regarding the surface properties of the hot-rolled steel sheet according to the present embodiment, the area ratio of scale damage portions having a depth of 10 µm or more needs to be 20% or less. When the area ratio of the scale damage portions exceeds 20%, local strain concentration occurs in the scale damage portions at an initial stage of bending and causes the occurrence of a crack which is a bend inside crack. From this viewpoint, the area ratio is preferably 10% or less, and more preferably 5% or less.

Figure 2:
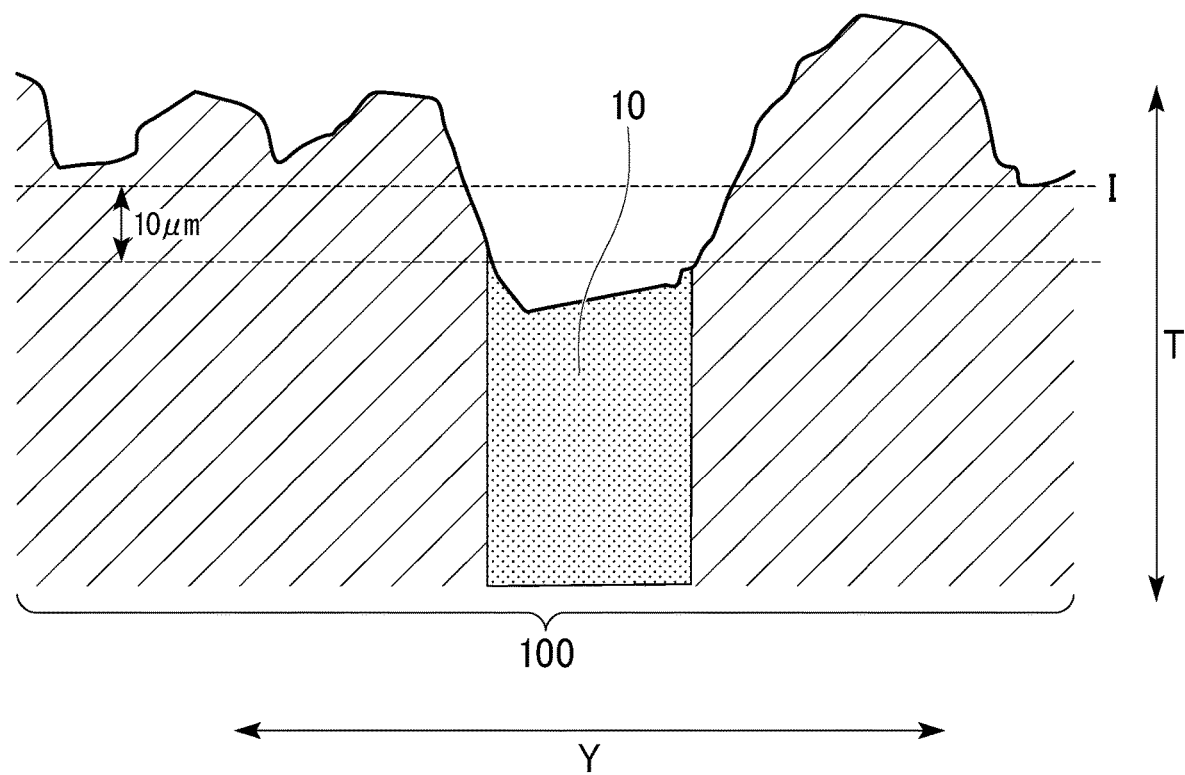
FIG. 2 is a cross-sectional view of the hot-rolled steel sheet according to the present embodiment in a sheet thickness direction taken along the line P-P' in FIG. 1.

A detailed method of defining the scale damage portion is as follows. Using a device such as a digital microscope (for example, RH-2000 (manufactured by Hirox Co., Ltd.)) that acquires 3D image data of a target by analyzing the depth of focus, 3D image data of a range of 3000 µm×3000 µm on the surface of a hot-rolled steel sheet is acquired. FIG. 1 is a schematic view in a case where the sheet surface of the hot-rolled steel sheet according to the present embodiment is viewed in a plan view, and FIG. 2 is a cross-sectional view of the hot-rolled steel sheet according to the present embodiment in the sheet thickness direction taken along the line P-P' in FIG. 1. In the acquired 3D image data, the average height position of the highest height position and the lowest height position is referred to as an average height position I, and a region having a height position lower than the average height position I by 10 µm or more is defined as a scale damage portion 10. Next, as shown in FIG. 1, the area ratio of the scale damage portions 10 is calculated by creating an image of a plan view of the 3D image data of the range of 3000 µm×3000 µm on the surface of a hot-rolled steel sheet 100 viewed from above in the rolling direction, and dividing the projected area of all the scale damage portions 10 included in the range by the total projected area of the range.

That is, in a case where there is no region having a height position lower than the average height position by 10 µm or more in the range of 3000 µm×3000 µm, there is no scale damage portion in the range.

Next, the scale damage portions as described above are often generated by pressing scale present on the surface layer by rolls during finish rolling, and may be stretched in a direction (C direction) perpendicular to the rolling direction (L direction). When the scale damage portion is stretched in one direction, strain concentration tends to occur particularly on the scale damage portion during bending having the direction as a bending axis, which causes a crack inside a bend.

From this viewpoint, it is desirable that the average aspect ratio of the scale damage portions is set to 5 or less. The average aspect ratio is preferably 3 or less, and more preferably 2 or less.

A detailed method of defining the average aspect ratio of the scale damage portion is as follows. A method of obtaining the aspect ratio of the scale damage portion will be described with reference to FIG. 1. As shown in FIG. 1, a length when a line segment parallel to the rolling direction X is drawn to be the longest inside one scale damage portion 10 is defined as a length A of the scale damage portion 10 in the L direction, and a length when a line segment running in the direction (C direction) Y perpendicular to the rolling direction (L direction) is drawn to be the longest is defined as a length B of the scale damage portion 10 in the C direction. A value A/B or B/A obtained by dividing the larger value of the length A in the L direction and the length B in the C direction by the smaller value is defined as the aspect ratio of the scale damage portion 10.

The aspect ratios are measured for all the scale damage portions 10 in a visual field of 3000 µm×3000 µm (in the example shown in FIG. 1, three scale damage portions 10), and the value obtained by averaging the aspect ratios is defined as the average aspect ratio.

3. Steel Sheet Structure

The hot-rolled steel sheet according to the present embodiment may have any phase of ferrite, pearlite, bainite, fresh martensite, and tempered martensite, pearlite, residual austenite, or the like as a constituent phase of the steel structure, and may contain a compound such as carbonitride in the structure.

For example, the steel structure may contain, by area %, 80% or less of ferrite and 0% to 100% of bainite or martensite, and may further contain 25% or less of residual austenite and 5% or less of pearlite.

4. Mechanical Properties

The hot-rolled steel sheet according to the present embodiment has a tensile strength (TS) of 780 MPa or more as a sufficient strength that contributes to a reduction in the weight of a vehicle. On the other hand, since it is difficult to achieve a tensile strength of more than 1470 MPa with the configuration of the present embodiment, the substantial upper limit of the tensile strength is 1470 MPa or less. Therefore, it is not necessary to set the upper limit of the tensile strength in particular, but in the present embodiment, the substantial upper limit of the tensile strength can be set to 1470 MPa.

A tensile test may be conducted in accordance with JIS Z 2241 (2011).

Therefore, in the hot-rolled steel sheet according to the present embodiment, it is preferable that the value of limit bending R/t, which is an index value of bend inside cracking, is 2.0 or less. The value of R/t can be obtained by cutting out a strip-shaped test piece from a ½ position of the hot-rolled steel sheet in the width direction, bending both a bend (L-axis bend) having a bending ridge parallel to the rolling direction (L direction) and a bend (C-axis bend) having a bending ridge parallel to the direction (C direction) perpendicular to the rolling direction in accordance with JIS Z 2248 (V-block 90° bending test), and investigating a crack that occurs on the inside of the bend. The minimum bend radius at which a crack having a length of 30 µm or more does not occur is obtained, and a value obtained by dividing the average value of the minimum bend radii of the L-axis and the C-axis by the sheet thickness can be used as the index value of bendability as the limit bending R/t.

5. Manufacturing Method

Next, a preferred manufacturing method of the hot-rolled steel sheet according to the present embodiment will be described.

A manufacturing process prior to hot rolling is not particularly limited. That is, subsequent to melting in a blast furnace or an electric furnace, various kinds of secondary smelting may be performed, and then casting may be performed by a method such as normal continuous casting, casting by an ingot method, or thin slab casting. In the case of continuous casting, a cast slab may be cooled to a low temperature once and then reheated to be hot-rolled, or the cast slab may be hot-rolled as it is after casting without being cooled to a low temperature. Scrap may be used as the raw material.

The cast slab is subjected to a heating step. In this heating step, the slab is heated to a temperature of 1100° C. or higher and 1300° C. or lower, and then held for 30 minutes or longer. In a case where Ti or Nb is added, the slab is heated to a temperature of 1200° C. or higher and 1300° C. or lower, and then held for 30 minutes or longer. When the heating temperature is lower than 1200° C., Ti and Nb, which are precipitate elements, are not sufficiently dissolved, so that sufficient precipitation hardening cannot be achieved during subsequent hot rolling, and the elements remain as coarse carbides and cause deterioration of formability, which is not preferable. Therefore, in a case where Ti and Nb are contained, the heating temperature of the slab is set to 1200° C. or higher. On the other hand, when the heating temperature exceeds 1300° C., the amount of scale generated increases and the yield decreases. Therefore, the heating temperature is set to 1300° C. or lower. The heating retention time is preferably set to 30 minutes or longer in order to sufficiently dissolve Ti and Nb. Furthermore, in order to suppress excessive scale loss, the heating retention time is set to preferably 10 hours or shorter, and more preferably 5 hours or shorter.

Next, the heated slab is subjected to a rough rolling step of performing rough rolling to obtain a rough-rolled sheet.

The rough rolling may be performed to form the slab into a desired dimensional shape, and the conditions thereof are not particularly limited. The thickness of the rough-rolled sheet affects the amount of temperature decrease from the head end to the tail end of the hot-rolled sheet from the start of rolling to the completion of the rolling in a finish rolling step and is thus preferably determined in consideration of this.

The rough-rolled sheet is subjected to finish rolling. In this finish rolling step, multi-stage finish rolling is performed. In the present embodiment, the finish rolling is performed in a temperature range of 850° C. to 1200° C. under the conditions satisfying Expression (2).

$$K'/Si^* \geq 2.5 \quad (2)$$

Here, in the case of $Si \geq 0.35$, $Si^*$ is set to $140\sqrt{Si}$, and in the case of $Si < 0.35$, $Si^*$ is set to 80. In addition, Si represents the Si content (mass %) of the steel sheet.

In addition, K' in Expression (2) is represented by Expression (3).

$$K' = D \times (DT-930) \times 1.5 + \Sigma((FT_n-930) \times S_n) \quad (3)$$

Here, D is the spray amount per time (m³/min) of hydraulic descaling before the start of the finish rolling, DT is the temperature (C) of the steel sheet when the hydraulic descaling is performed before the start of the finish rolling, and $FT_n$ is the temperature (C) of the steel sheet at an nth stage of the finish rolling, and $S_n$ is the spray amount per time (m³/min) when water is sprayed onto the steel sheet in a spray form between an (n−1)th stage and the nth stage of the finish rolling.

$Si^*$ is a parameter related to the steel sheet composition that indicates the ease of formation of a scale damage portion. When the amount of Si in the steel sheet composition is large, the scale generated on the surface layer during hot rolling grows from wustite (FeO), which is relatively easily descaled and less likely to form a scale damage portion in the steel sheet, to take root in the steel sheet, and changes to fayalite ($Fe_2SiO_4$) that is more likely to form a scale damage portion. Therefore, the larger the amount of Si, that is, the larger the $Si^*$, the easier it is for a scale damage portion to be formed on the surface layer. Here, the ease of formation of a scale damage portion on the surface layer due to the addition of Si becomes particularly effective when 0.35 mass % or more of Si is added. Therefore, when 0.35 mass % or more of Si is added, $Si^*$ is a function of Si, whereas when the amount of Si is less than 0.35 mass %, $Si^*$ becomes a constant.

K' is a parameter of manufacturing conditions indicating the difficulty of formation of a scale damage portion. The first term of Expression (3) indicates that in order to suppress the formation of a scale damage portion, when hydraulic descaling is performed before the start of the finish rolling, the larger the spray amount per time of hydraulic descaling and the higher the temperature of the steel sheet, the more effective it is from the viewpoint of descaling. When a plurality of descaling steps are performed before the start of the finish rolling, a value of descaling closest to the finish rolling and before an initial spraying step $S_1$ is used.

The second term of Expression (3) is a term indicating the effect of, during finish rolling, descaling scale that has not been completely peeled off by descaling before finishing or scale that has been formed again during finish rolling, and indicates that descaling becomes easier by spraying a large amount of water onto the steel sheet in a spray form at a high temperature.

Considering the mechanism of descaling control, the original parameter of the manufacturing conditions indicating the difficulty of formation of a scale damage portion is considered to be obtained by integrating the product of "parameter related to temperature" and "parameter related to the amount of water sprayed" in a temperature range in which finish rolling is performed. This is due to the idea that descaling is promoted by spraying more water at a higher temperature.

In order to achieve simpler parameters in controlling the manufacturing conditions, the present inventors found that the surface roughness can be controlled by using the parameter K' (Expression 3) corresponding to the sum of the original parameter divided between rolls.

Here, it is considered that the parameter K' deviates from the above-mentioned original parameter depending on the number of stands of a finishing mill, a roll-to-roll distance, and a sheet threading speed. However, the present inventors confirmed that the surface roughness can be controlled by using the parameter K' when the number of finish rolling stands is in a range of 5 to 8, the roll-to-roll distance is in a range of 4500 mm to 7000 mm, and the sheet threading speed (speed after passing the final stage) is in a range of 400 to 900 mpm.

When the ratio of the parameter K' of the manufacturing conditions indicating the difficulty of formation of a scale damage portion to the parameter $Si^*$ related to the steel sheet composition indicating the ease of formation of a scale damage portion is 2.5 or more, the area ratio of the scale damage portions can be set to 20% or less, and the occurrence of a crack inside the bend can be suppressed. The ratio is preferably 3.0 or more, and more preferably 3.5 or more.

When $K'/Si^*$ is set to 3.0 or more, the average aspect ratio of the scale damage portions can be set to 5 or less, and more preferable surface properties can be obtained. The reason for this is not completely clear, but can be presumed as follows. That is, when a roll presses scale into the steel sheet and a scale damage portion is formed, the scale is pressed into the steel sheet while being divided at a certain interval in the direction of the shaft of the roll, that is, the direction (C direction) perpendicular to the rolling direction (L direction). This is the reason why the scale damage portion tends to have a shape stretched in the C direction. At this time, it is presumed that the thicker the scale, the longer the interval at which the scale is divided, and there is a possibility that the aspect ratio of the scale damage portion may increase. Therefore, it is considered that the aspect ratio of the scale damage portion can also be reduced by increasing $K'/Si^*$ and achieving a condition under which scale is less likely to be present during finish rolling.

In addition, in the finish rolling, it is desirable to satisfy the condition represented by Expression (4).

$$F \geq 0.5 \quad (4)$$

F represents the ratio of the time (z seconds) for which the surface of the steel sheet is covered with a water film to the total time (x−y seconds) obtained by subtracting the time (y seconds) for which the steel sheet is in contact with a roll from the time (x seconds) from the start to the completion of the finish rolling. That is, F is represented by F=z/(x−y).

Scale that grows during finish rolling as described above can also cause the formation of scale damage portions in the steel sheet, but the growth thereof can be suppressed by covering the surface of the steel sheet with a water film. Therefore, it is desirable that the time for which the surface of the steel sheet is covered with a water film is long. As a method of covering the surface of the steel sheet with a water film, there is a method of spraying water between rolls in a spray form.

When K'/Si*≥2.5 and F≥0.5 are simultaneously satisfied, the area ratio of the scale damage portions can be reduced compared to when only K'/Si*≥2.5 is satisfied, and the occurrence of a crack inside the bend can be further suppressed. Furthermore, when F≥0.5 is satisfied, the average aspect ratio of recessed parts can be set to 5 or less even in a range of 3.0>K'/Si*≥2.5, and the occurrence of a crack inside the bend can be further suppressed. From this viewpoint, F is preferably 0.6 or more, and more preferably 0.7 or more.

The sheet thickness after finish rolling is set to be less than 5.0 mm. This is because hot rolling has an effect of reducing irregularities by pressing the surface of the steel sheet with a roll after the scale has been removed, and this effect is easily obtained when the sheet thickness after finish rolling is less than 5.0 mm. The sheet thickness after finish rolling is preferably 4.5 mm or less. On the other hand, when the sheet thickness after finish rolling is 5.0 mm or more, the specified surface state cannot be obtained and the bendability deteriorates.

Subsequent to the finish rolling, a cooling step and a coiling step are performed.

In the hot-rolled steel sheet of the present embodiment, excellent bending workability is achieved by controlling the surface properties rather than controlling the base structure. Therefore, the conditions of the cooling step and the coiling step are not particularly limited. Therefore, the cooling step and the coiling step after the multi-stage finish rolling may be performed by a normal method.

The hot-rolled steel sheet may be pickled, as necessary, after cooling. The pickling may be performed, for example, in hydrochloric acid having a concentration of 3% to 10% at a temperature of 85° C. to 98° C. for 20 seconds to 100 seconds.

The hot-rolled steel sheet may be subjected to skin pass rolling after cooling, as necessary. Skin pass rolling has effects of preventing stretcher strain that occurs during processing and forming, and of shape correction.

EXAMPLES

Hereinafter, the hot-rolled steel sheet according to the present invention will be described in more detail with reference to examples. However, the following examples are examples of the hot-rolled steel sheet of the present invention, and the hot-rolled steel sheet of the present invention is not limited to the following examples. The conditions in the examples described below are one example of conditions adopted to confirm the feasibility and effects of the present invention, and the present invention is not limited to this one example of conditions. The present invention can adopt various conditions as long as the object of the present invention is achieved without departing from the gist of the present invention.

Steels having the chemical composition shown in Table 1 were cast, cooled as they were or to room temperature once after the casting, then reheated, and heated to a temperature range of 1200° C. to 1300° C. Thereafter, the slabs were rough-rolled at a temperature of 1100° C. or higher to produce rough-rolled sheets.

The rough-rolled sheet was finish-rolled to the finish-rolled sheet thickness shown in Tables 2 and 3 using the following three types of finishing mills.

Rolling mill A: seven stands, roll-to-roll distance 5500 mm, sheet threading speed 700 mpm Rolling mill B: six stands, roll-to-roll distance 5500 mm, sheet threading speed 600 mpm Rolling mill C: seven stands, roll-to-roll distance 6000 mm, sheet threading speed 700 mpm Thereafter, hot rolling was performed under the conditions shown in Tables 2 and 3. The finishing mill used is also shown in Tables 2 and 3. Since the temperature DT of the steel sheet when descaling is performed was almost the same as a finish rolling start temperature here, K' was calculated using the temperature $FT_1$ of the steel sheet at a first stage of the finish rolling. After the finish rolling was completed, cooling and coiling were performed in each of cooling patterns shown below with the aim of causing the hot-rolled sheet structure to have bainite, ferrite-bainite, and martensite.

(Bainite Pattern: Cooling Pattern B)

A hot-rolled steel sheet produced by this pattern was subjected to a cooling step and a coiling step by being cooled to a coiling temperature of 450° C. to 550° C. at a cooling rate of 20° C./s or more after finish rolling, and then being coiled into a coil shape.

(Ferrite-Bainite Pattern: Cooling Pattern F+B)

A hot-rolled steel sheet produced by this pattern was obtained by performing a cooling step and a coiling step by being cooled to a cooling stop temperature range of 600° C. to 750° C. at an average cooling rate of 20° C./s or more after finish rolling, held in the cooling stop temperature range for 2 to 4 seconds, and further coiled into a coil shape at a coiling temperature of 500° C. to 600° C. at an average cooling rate of 20° C./s or more. In a case where it was necessary to clearly determine the temperature, retention time, and the like in this step, the temperature and time were set using the Ar3 temperature of the following expression. In the following expression, C, Si, Mn, Ni, Cr, Cu, and Mo represent the amounts of the corresponding elements in the unit: mass %.

$$Ar3(° C.)=870-390C+24Si-70Mn-50Ni-5Cr-20Cu+80Mo$$

(Martensite Pattern: Cooling Pattern Ms)

A hot-rolled steel sheet produced by this pattern was produced by performing a cooling step and a coiling step by being cooled to a coiling temperature of 100° C. or lower at an average cooling rate of 20° C./s or more after the completion of the finish rolling, and then being coiled into a coil shape.

Each of the hot-rolled steel sheets was pickled in hydrochloric acid having a concentration of 3% to 10% at a temperature of 85° C. to 98° C. for 20 seconds to 100 seconds to peel off scale.

A scale damage portion was measured as follows. Using RH-2000 (manufactured by Hirox Co., Ltd.), 3D image data of a range of 3000 μm×3000 μm on the surface of the hot-rolled steel sheet was acquired, and the area ratio (%) and aspect ratio of the scale damage portion defined above was calculated.

For the tensile strength, a tensile test was conducted in accordance with JIS Z 2241 (2011) using a JIS No. 5 test piece collected from a ¼ position of the hot-rolled steel sheet in the width direction so as to have the direction (C direction) perpendicular to the rolling direction (L direction) as its longitudinal direction, and a tensile strength TS (MPa), a butt elongation (total elongation) EL (%), and a limit bending (R/t) were obtained. The respective measurement results are shown in Tables 4 and 5. As the tensile strength TS, those having a tensile strength of 780 MPa or more regarded as being acceptable.

As a bending test piece, a strip-shaped test piece having a size of 100 mm×30 mm was cut out from a ½ position of the hot-rolled steel sheet in the width direction and provided for the following test.

Bending workability was investigated in accordance with JIS Z 2248 (V-block 90° bending test) for both a bend (L-axis bend) having a bending ridge parallel to the rolling direction (L direction) and a bend (C-axis bend) having a bending ridge parallel to the direction (C direction) perpendicular to the rolling direction, the minimum bend radius at which no crack had occurred was obtained, and a value obtained by dividing the average value of the minimum bend radii of the L-axis and the C-axis by the sheet thickness was used as the index value of bendability as the limit bending R/t. Those having a limit bending R/t of 2.0 or less were regarded as being acceptable.

However, regarding the presence or absence of a crack, a cross section obtained by cutting the test piece after the V-block 900 bending test in a plane parallel to the bending direction and perpendicular to the sheet surface was mirror-polished, thereafter a crack was observed with an optical microscope, and a case where the length of the crack observed inside the bend of the test piece exceeded 30 μm was determined to have a crack.

TABLE 1

| | Chemical composition (unit: mass %, remainder consisting of Fe and impurities) | | | | | | | | | | |
|---|---|---|---|---|---|---|---|---|---|---|---|
| Steel | C | Si | Mn | sol. Al | Ti | Nb | P | S | N | Others | Classification |
| A | 0.060 | 1.20 | 2.60 | 0.100 | 0.11 | 0.02 | 0.010 | 0.0020 | 0.00200 | B: 0001 | Example |
| B | 0.060 | 0.05 | 2.50 | 0.030 | | | 0.010 | 0.0010 | 0.00200 | | Example |
| C | 0.070 | 0.80 | 2.20 | 0.050 | 0.12 | 0.02 | 0.010 | 0.0010 | 0.00300 | Ca: 0.002 | Example |
| D | 0.050 | 0.40 | 2.10 | 0.030 | 0.10 | | 0.008 | 0.0010 | 0.00300 | B: 0.002 | Example |
| E | 0.060 | 1.50 | 2.20 | 0.030 | 0.11 | 0.02 | 0.010 | 0.0020 | 0.00300 | | Example |
| F | 0.080 | 2.00 | 2.00 | 0.025 | 0.09 | 0.01 | 0.010 | 0.0010 | 0.00300 | Cr: 0.4 | Example |
| G | 0.060 | 0.70 | 1.80 | 0.030 | 0.10 | 0.01 | 0.011 | 0.0010 | 0.00300 | V: 0.01 | Example |
| H | 0.120 | 1.30 | 1.80 | 0.020 | 0.09 | 0.01 | 0.012 | 0.0010 | 0.00300 | Mo: 0.01 | Example |
| I | 0.060 | 1.10 | 1.60 | 0.020 | 0.11 | 0.01 | 0.010 | 0.0010 | 0.00200 | Cu: 0.01 | Example |
| J | 0.060 | 1.02 | 1.80 | 0.030 | 0.10 | 0.02 | 0.010 | 0.0010 | 0.00300 | Co: 0.1 | Example |
| K | 0.060 | 0.90 | 1.88 | 0.029 | 0.11 | 0.01 | 0.010 | 0.0010 | 0.00300 | W: 0.01 | Example |
| L | 0.070 | 1.80 | 1.10 | 0.020 | 0.11 | 0.01 | 0.012 | 0.0030 | 0.00300 | Ni: 0.8 | Example |
| M | 0.110 | 1.20 | 1.80 | 0.021 | 0.10 | 0.03 | 0.013 | 0.0010 | 0.00200 | Mg: 0.002 | Example |
| N | 0.080 | 0.87 | 1.30 | 0.030 | 0.08 | 0.02 | 0.011 | 0.0020 | 0.00300 | REM: 0.001 | Example |
| O | 0.090 | 1.43 | 1.80 | 0.130 | 0.12 | 0.03 | 0.014 | 0.0010 | 0.00200 | Zr: 0.002 | Example |
| P | 0.050 | 0.90 | 1.60 | 0.030 | 0.03 | 0.04 | 0.010 | 0.0030 | 0.00300 | B: 0.002 | Example |
| Q | 0.060 | 1.10 | 0.50 | 0.027 | 0.09 | 0.02 | 0.030 | 0.0030 | 0.00300 | | Comparative Example |
| R | 0.130 | 0.12 | 4.50 | 0.030 | 0.19 | 0.10 | 0.015 | 0.0050 | 0.00300 | B: 0.0012 | Comparative Example |
| S | 0.220 | 1.20 | 2.80 | 0.020 | 0.08 | 0.02 | 0.030 | 0.0020 | 0.00300 | | Example |
| T | 0.060 | 0.40 | 2.20 | 1.000 | 0.18 | 0.06 | 0.030 | 0.0020 | 0.00300 | | Example |

TABLE 2

| Note | No. | Kind of steel | Sheet thickness (mm) | Amount of Si (%) | Temperature (° C.) of steel sheet at nth stage of finish rolling | | | | | | | Spray amount (m³/min) of hydraulic descaling Before start of finish rolling |
|---|---|---|---|---|---|---|---|---|---|---|---|---|
| | | | | | FT1 | FT2 | FT3 | FT4 | FT5 | FT6 | FT7 | |
| Comparative Example | 1 | A | 2.8 | 1.20 | 999 | 990 | 981 | 972 | 962 | 953 | 944 | 1.0 |
| Comparative Example | 2 | A | 2.8 | 1.20 | 1002 | 992 | 983 | 974 | 965 | 956 | 947 | 1.0 |
| Example | 3 | A | 2.0 | 1.20 | 1004 | 995 | 986 | 977 | 968 | 959 | 949 | 1.0 |
| Example | 4 | A | 2.4 | 1.20 | 998 | 989 | 980 | 971 | 962 | 953 | 943 | 3.0 |
| Example | 5 | A | 2.8 | 1.20 | 999 | 990 | 981 | 972 | 963 | 953 | 944 | 1.0 |
| Example | 6 | A | 3.2 | 1.20 | 998 | 988 | 979 | 970 | 961 | 952 | 943 | 4.0 |
| Example | 7 | A | 3.8 | 1.20 | 996 | 987 | 978 | 969 | 960 | 950 | 941 | 1.0 |
| Comparative Example | 8 | A | 2.8 | 1.20 | 1056 | 1037 | 1018 | 999 | 980 | 960 | 941 | 1.0 |

TABLE 2-continued

| Note | No. | | | | | | | | | | |
|---|---|---|---|---|---|---|---|---|---|---|---|
| Example | 9 | A | 2.0 | 1.20 | 1057 | 1038 | 1019 | 1000 | 980 | 961 | 942 | 1.0 |
| Example | 10 | A | 2.4 | 1.20 | 1062 | 1043 | 1024 | 1005 | 985 | 966 | 947 | 1.0 |
| Example | 11 | A | 3.0 | 1.20 | 1058 | 1039 | 1020 | 1001 | 981 | 962 | 943 | 1.0 |
| Example | 12 | A | 3.8 | 1.20 | 1063 | 1043 | 1024 | 1005 | 986 | 967 | 948 | 1.0 |
| Comparative Example | 13 | B | 2.8 | 0.05 | 1028 | 1009 | 987 | 972 | 945 | 928 | 906 | 1.0 |
| Example | 14 | B | 2.0 | 0.05 | 1022 | 1003 | 981 | 966 | 939 | 922 | 900 | 1.0 |
| Example | 15 | B | 2.4 | 0.05 | 1023 | 1004 | 982 | 967 | 940 | 923 | 901 | 1.0 |
| Example | 16 | B | 2.8 | 0.05 | 1027 | 1008 | 986 | 971 | 944 | 927 | 905 | 1.0 |
| Example | 17 | B | 3.6 | 0.05 | 1021 | 1002 | 980 | 965 | 938 | 921 | 899 | 3.0 |
| Example | 18 | B | 4.5 | 0.05 | 1023 | 1004 | 982 | 967 | 940 | 923 | 901 | 1.0 |
| Comparative Example | 19 | B | 2.8 | 0.05 | 1034 | 1014 | 1002 | 992 | 981 | 966 | 949 | 0.0 |
| Example | 20 | B | 2.0 | 0.05 | 1027 | 1007 | 995 | 985 | 974 | 959 | 942 | 1.0 |
| Comparative Example | 21 | C | 2.8 | 0.80 | 998 | 989 | 980 | 971 | 962 | 953 | 943 | 1.0 |
| Comparative Example | 22 | C | 2.8 | 0.80 | 1005 | 996 | 987 | 977 | 968 | 959 | 950 | 1.0 |
| Example | 23 | C | 2.9 | 0.80 | 998 | 988 | 979 | 970 | 961 | 952 | 943 | 1.0 |
| Example | 24 | C | 2.9 | 0.80 | 1064 | 1045 | 1026 | 1007 | 988 | 969 | 949 | 1.0 |
| Example | 25 | C | 2.9 | 0.80 | 1063 | 1044 | 1025 | 1006 | 987 | 967 | 948 | 1.0 |

| | | Spray amount (m³/min) of hydraulic descaling | | | | | | | Rolling mill | Cooling pattern | Ratio F |
|---|---|---|---|---|---|---|---|---|---|---|---|
| Note | No. | S1 | S2 | S3 | S4 | S5 | S6 | S7 | | | |
| Comparative Example | 1 | 0.4 | 1.0 | 0.0 | 0.0 | 0.0 | 0.0 | 0.0 | A | F + B | 0.4 |
| Comparative Example | 2 | 0.4 | 0.0 | 1.2 | 0.0 | 0.0 | 0.0 | 2.4 | A | F + B | 0.3 |
| Example | 3 | 0.4 | 1.2 | 2.4 | 1.1 | 0.0 | 1.5 | 2.4 | A | F + B | 0.9 |
| Example | 4 | 0.4 | 1.2 | 2.4 | 1.1 | 0.0 | 1.5 | 2.4 | A | F + B | 0.9 |
| Example | 5 | 0.4 | 1.2 | 2.4 | 1.1 | 0.0 | 1.5 | 2.4 | C | B | 0.9 |
| Example | 6 | 0.4 | 1.2 | 2.4 | 1.1 | 0.0 | 1.5 | 2.4 | A | B | 0.9 |
| Example | 7 | 0.4 | 1.2 | 2.4 | 1.1 | 0.0 | 1.5 | 2.4 | A | MS | 0.9 |
| Comparative Example | 8 | 0.4 | 0.0 | 1.2 | 0.0 | 0.0 | 0.0 | 0.0 | A | F + B | 0.2 |
| Example | 9 | 0.4 | 0.0 | 1.2 | 0.0 | 0.0 | 0.0 | 2.4 | A | F + B | 0.3 |
| Example | 10 | 0.4 | 0.0 | 1.2 | 0.0 | 0.0 | 0.0 | 2.4 | A | B | 0.3 |
| Example | 11 | 0.4 | 0.0 | 1.2 | 0.0 | 0.0 | 0.0 | 2.4 | A | MS | 0.3 |
| Example | 12 | 0.4 | 1.2 | 2.4 | 1.1 | 0.0 | 1.5 | 2.4 | A | F + B | 0.9 |
| Comparative Example | 13 | 0.0 | 0.0 | 0.0 | 0.0 | 1.0 | 1.0 | 1.0 | A | MS | 0.2 |
| Example | 14 | 0.0 | 0.0 | 1.8 | 0.0 | 0.0 | 0.4 | 0.4 | A | MS | 0.4 |
| Example | 15 | 0.0 | 1.4 | 1.8 | 1.8 | 1.8 | 0.4 | 0.4 | A | MS | 1.0 |
| Example | 16 | 0.0 | 1.4 | 1.8 | 1.8 | 1.8 | 0.4 | 0.4 | A | F + B | 1.0 |
| Example | 17 | 0.0 | 1.4 | 1.8 | 1.8 | 1.8 | 0.4 | 0.4 | A | F + B | 1.0 |
| Example | 18 | 0.0 | 1.4 | 1.8 | 1.8 | 1.8 | 0.4 | 0.4 | A | B | 1.0 |
| Comparative Example | 19 | 0.0 | 0.0 | 0.0 | 1.8 | 0.0 | 0.4 | 0.4 | A | MS | 0.3 |
| Example | 20 | 0.0 | 1.4 | 1.8 | 1.8 | 1.8 | 0.4 | 0.4 | A | MS | 1.0 |
| Comparative Example | 21 | 0.4 | 0.0 | 1.2 | 0.0 | 0.0 | 0.0 | 0.0 | A | F + B | 0.2 |
| Comparative Example | 22 | 0.4 | 0.0 | 1.2 | 0.0 | 0.0 | 0.0 | 2.4 | A | F + B | 0.3 |
| Example | 23 | 0.4 | 1.2 | 2.4 | 1.1 | 0.0 | 1.5 | 2.4 | A | F + B | 0.9 |
| Example | 24 | 0.4 | 0.0 | 1.2 | 0.0 | 0.0 | 0.0 | 0.0 | A | F + B | 0.2 |
| Example | 25 | 0.4 | 0.0 | 1.2 | 0.0 | 0.0 | 0.0 | 2.4 | A | F + B | 0.3 |

TABLE 3

| Note | No. | Kind of steel | Sheet thickness (mm) | Amount of Si (%) | Temperature (° C.) of steel sheet at nth stage of finish rolling | | | | | | | Spray amount (m³/min) of hydraulic descaling Before start of finish rolling |
|---|---|---|---|---|---|---|---|---|---|---|---|---|
| | | | | | FT1 | FT2 | FT3 | FT4 | FT5 | FT6 | FT7 | |
| Example | 26 | C | 2.9 | 0.80 | 1059 | 1040 | 1021 | 1002 | 983 | 964 | 944 | 1.0 |
| Example | 27 | C | 2.9 | 0.80 | 1072 | 1056 | 1041 | 1026 | 1011 | 996 | 981 | 1.0 |
| Example | 28 | C | 2.9 | 0.80 | 1069 | 1054 | 1038 | 1023 | 1008 | 993 | 978 | 1.0 |
| Example | 29 | C | 2.9 | 0.80 | 1075 | 1060 | 1045 | 1030 | 1015 | 999 | 984 | 1.0 |
| Comparative Example | 30 | D | 2.9 | 0.40 | 999 | 990 | 981 | 972 | 962 | 953 | 944 | 1.0 |
| Example | 31 | D | 2.9 | 0.40 | 997 | 988 | 979 | 970 | 960 | 951 | 942 | 1.0 |
| Example | 32 | D | 2.9 | 0.40 | 997 | 987 | 978 | 969 | 960 | 951 | 942 | 1.0 |
| Example | 33 | D | 2.9 | 0.40 | 1059 | 1040 | 1021 | 1002 | 983 | 963 | — | 1.0 |
| Example | 34 | D | 2.9 | 0.40 | 1063 | 1043 | 1024 | 1005 | 986 | 967 | 948 | 1.0 |
| Example | 35 | D | 2.9 | 0.40 | 1077 | 1062 | 1046 | 1031 | 1016 | 1001 | — | 1.0 |
| Example | 36 | D | 2.9 | 0.40 | 1076 | 1061 | 1045 | 1030 | 1015 | 1000 | 985 | 1.0 |
| Comparative Example | 37 | E | 2.9 | 1.50 | 1056 | 1036 | 1017 | 998 | 979 | 960 | 941 | 1.0 |
| Comparative Example | 38 | F | 2.9 | 2.00 | 1064 | 1045 | 1026 | 1007 | 988 | 969 | 949 | 1.0 |
| Example | 39 | G | 2.9 | 0.70 | 1065 | 1046 | 1026 | 1007 | 988 | 969 | 950 | 1.0 |
| Example | 40 | H | 2.9 | 1.30 | 1055 | 1036 | 1017 | 998 | 978 | 959 | 940 | 2.0 |
| Example | 41 | I | 2.9 | 1.10 | 1058 | 1038 | 1019 | 1000 | 981 | 962 | 943 | 1.0 |
| Example | 42 | J | 2.9 | 1.02 | 1059 | 1040 | 1021 | 1002 | 982 | 963 | 944 | 1.0 |
| Example | 43 | K | 2.9 | 0.90 | 1060 | 1041 | 1022 | 1003 | 983 | 964 | 945 | 1.0 |
| Example | 44 | L | 2.9 | 1.80 | 999 | 990 | 981 | 972 | 963 | 953 | 944 | 1.0 |
| Example | 45 | M | 2.9 | 1.20 | 999 | 990 | 982 | 970 | 963 | 954 | 944 | 1.0 |
| Example | 46 | N | 2.9 | 0.87 | 1062 | 1043 | 1024 | 1004 | 985 | 966 | 947 | 1.0 |
| Example | 47 | O | 2.9 | 1.43 | 1058 | 1039 | 1019 | 1000 | 981 | 962 | 943 | 2.0 |
| Example | 48 | P | 2.9 | 0.90 | 1060 | 1041 | 1022 | 1003 | 983 | 964 | 945 | 1.0 |
| Comparative Example | 49 | Q | 2.9 | 1.10 | 1056 | 1037 | 1018 | 998 | 979 | 960 | 941 | 1.0 |
| Comparative Example | 50 | R | 2.9 | 0.12 | 1063 | 1044 | 1024 | 1005 | 986 | 967 | 948 | 1.0 |
| Example | 51 | S | 2.9 | 1.20 | 998 | 987 | 982 | 973 | 964 | 952 | 943 | 1.0 |
| Example | 52 | T | 2.9 | 0.40 | 995 | 985 | 980 | 975 | 965 | 950 | 942 | 1.0 |
| Comparative Example | 53 | A | 5.0 | 1.20 | 1001 | 994 | 983 | 975 | 968 | 955 | 948 | 1.0 |

| Note | No. | Spray amount (m³/min) of hydraulic descaling | | | | | | | Rolling mill | Cooling pattern | Ratio F |
|---|---|---|---|---|---|---|---|---|---|---|---|
| | | S1 | S2 | S3 | S4 | S5 | S6 | S7 | | | |
| Example | 26 | 0.4 | 1.2 | 2.4 | 1.1 | 0.0 | 1.5 | 2.4 | A | B | 0.9 |
| Example | 27 | 0.4 | 0.0 | 1.2 | 0.0 | 0.0 | 0.0 | 0.0 | A | B | 0.2 |
| Example | 28 | 0.4 | 0.0 | 1.2 | 0.0 | 0.0 | 0.0 | 2.4 | A | B | 0.3 |
| Example | 29 | 0.4 | 1.2 | 2.4 | 1.1 | 0.0 | 1.5 | 2.4 | A | B | 0.9 |
| Comparative Example | 30 | 0.4 | 0.0 | 1.2 | 0.0 | 0.0 | 0.0 | 0.0 | A | B | 0.2 |
| Example | 31 | 0.4 | 0.0 | 1.2 | 0.0 | 0.0 | 0.0 | 2.4 | A | B | 0.3 |
| Example | 32 | 0.4 | 1.2 | 2.4 | 1.1 | 0.0 | 1.5 | 2.4 | C | B | 0.9 |
| Example | 33 | 0.4 | 0.0 | 1.2 | 0.0 | 0.0 | 0.0 | — | B | B | 0.2 |
| Example | 34 | 0.4 | 0.0 | 1.2 | 0.0 | 0.0 | 0.0 | 2.4 | A | B | 0.3 |
| Example | 35 | 0.4 | 0.0 | 1.2 | 0.0 | 0.0 | 0.0 | — | B | B | 0.2 |
| Example | 36 | 0.4 | 0.0 | 1.2 | 0.0 | 0.0 | 0.0 | 2.4 | A | B | 0.3 |
| Comparative Example | 37 | 0.4 | 0.0 | 1.2 | 0.0 | 0.0 | 0.0 | 2.4 | A | F + B | 0.3 |
| Comparative Example | 38 | 0.4 | 0.0 | 1.2 | 0.0 | 0.0 | 0.0 | 2.4 | A | F + B | 0.3 |
| Example | 39 | 0.4 | 0.0 | 1.2 | 0.0 | 0.0 | 0.0 | 2.4 | A | F + B | 0.3 |
| Example | 40 | 0.4 | 0.0 | 1.2 | 0.0 | 0.0 | 0.0 | 2.4 | A | F + B | 0.3 |
| Example | 41 | 0.4 | 0.0 | 1.2 | 0.0 | 0.0 | 0.0 | 2.4 | A | F + B | 0.3 |
| Example | 42 | 0.4 | 0.0 | 1.2 | 0.0 | 0.0 | 0.0 | 2.4 | A | F + B | 0.3 |
| Example | 43 | 0.4 | 0.0 | 1.2 | 0.0 | 0.0 | 0.0 | 2.4 | A | F + B | 0.3 |
| Example | 44 | 0.4 | 1.2 | 2.4 | 1.1 | 1.0 | 1.5 | 2.4 | A | B | 1.0 |
| Example | 45 | 0.4 | 1.2 | 2.4 | 1.1 | 0.0 | 1.5 | 2.4 | A | B | 0.9 |

TABLE 3-continued

| Note | No. | | | | | | | | | | |
|---|---|---|---|---|---|---|---|---|---|---|---|
| Example | 46 | 0.4 | 0.0 | 1.2 | 0.0 | 0.0 | 0.0 | 2.4 | A | F + B | 0.3 |
| Example | 47 | 0.4 | 0.0 | 1.2 | 0.0 | 0.0 | 0.0 | 2.4 | A | F + B | 0.3 |
| Example | 48 | 0.4 | 0.0 | 1.2 | 0.0 | 0.0 | 0.0 | 2.4 | A | B | 0.3 |
| Comparative Example | 49 | 0.4 | 0.0 | 1.2 | 0.0 | 0.0 | 0.0 | 2.4 | A | B | 0.3 |
| Comparative Example | 50 | 0.4 | 0.0 | 1.2 | 0.0 | 0.0 | 0.0 | 2.4 | A | B | 0.3 |
| Example | 51 | 0.4 | 1.2 | 2.4 | 1.1 | 0.0 | 1.5 | 2.4 | A | B | 0.9 |
| Example | 52 | 0.4 | 1.2 | 2.4 | 1.1 | 0.0 | 1.5 | 2.4 | A | B | 0.9 |
| Comparative Example | 53 | 0.4 | 1.2 | 2.4 | 1.1 | 0.0 | 1.5 | 2.4 | A | F + B | 0.9 |

TABLE 4

| Note | No. | $Si^+$ | $K^+$ | $K^+/Si^+$ | Area ratio of scale damage portion (%) | Aspect ratio of scale damage portion | Tensile strength TS (MPa) | Total elongation EL (%) | Limit bending R/t |
|---|---|---|---|---|---|---|---|---|---|
| Example | 1 | 153 | 191 | 1.2 | <u>35</u> | 6.5 | 858 | 18.9 | 2.5 |
| Comparative Example | 2 | 153 | 240 | 1.6 | <u>32</u> | 6.3 | 848 | 18.5 | 2.4 |
| Example | 3 | 153 | 496 | 3.2 | 5 | 3.1 | 852 | 18.5 | 1.2 |
| Example | 4 | 153 | 638 | 4.2 | 8 | 1.5 | 850 | 18.9 | 0.8 |
| Example | 5 | 153 | 441 | 2.9 | 15 | 3.6 | 976 | 17.4 | 1.4 |
| Example | 6 | 153 | 727 | 4.7 | 5 | 1.6 | 962 | 17.2 | 0.8 |
| Example | 7 | 153 | 409 | 2.7 | 13 | 3.8 | 1204 | 10.4 | 1.4 |
| Comparative Example | 8 | 153 | 345 | 2.3 | <u>22</u> | 6.2 | 844 | 17.9 | 2.3 |
| Example | 9 | 153 | 377 | 2.5 | 16 | 5.3 | 853 | 17.0 | 1.6 |
| Example | 10 | 153 | 404 | 2.6 | 14 | 5.8 | 850 | 17.3 | 1.7 |
| Example | 11 | 153 | 382 | 2.5 | 18 | 5.2 | 1206 | 10.5 | 1.6 |
| Example | 12 | 153 | 795 | 5.2 | 6 | 1.7 | 914 | 15.6 | 0.8 |
| Comparative Example | 13 | 80 | 138 | 1.7 | <u>30</u> | 6.1 | 1206 | 10.7 | 2.2 |
| Example | 14 | 80 | 213 | 2.7 | 15 | 5.4 | 1218 | 11.0 | 1.8 |
| Example | 15 | 80 | 398 | 5.0 | 7 | 1.8 | 1205 | 10.9 | 0.8 |
| Example | 16 | 80 | 435 | 5.4 | 8 | 1.8 | 848 | 16.5 | 0.7 |
| Example | 17 | 80 | 662 | 8.3 | 8 | 1.7 | 856 | 16.6 | 0.7 |
| Example | 18 | 80 | 404 | 5.0 | 7 | 1.7 | 855 | 15.5 | 0.7 |
| Comparative Example | 19 | 80 | 132 | 1.6 | <u>31</u> | 6.4 | 1206 | 10.5 | 2.3 |
| Example | 20 | 80 | 560 | 7.0 | 8 | 2.6 | 1209 | 10.8 | 1.4 |
| Comparative Example | 21 | 125 | 190 | 1.5 | <u>32</u> | 6.3 | 997 | 14.3 | 2.5 |
| Comparative Example | 22 | 125 | 258 | 2.1 | <u>27</u> | 6.3 | 986 | 14.1 | 2.5 |
| Example | 23 | 125 | 424 | 3.4 | 7 | 1.4 | 999 | 14.4 | 0.7 |
| Example | 24 | 125 | 371 | 3.0 | 6 | 2.6 | 988 | 14.3 | 1.4 |
| Example | 25 | 125 | 411 | 3.3 | 7 | 2.6 | 980 | 14.7 | 1.4 |

TABLE 5

| Note | No. | $Si^+$ | $K^+$ | $K^+/Si^+$ | Area ratio of scale damage portion (%) | Aspect ratio of scale damage portion | Tensile strength TS (MPa) | Total elongation EL (%) | Limit bending R/t |
|---|---|---|---|---|---|---|---|---|---|
| Example | 26 | 125 | 761 | 6.1 | 7 | 4.3 | 1121 | 13.3 | 1.3 |
| Example | 27 | 125 | 403 | 3.2 | 8 | 3.4 | 1127 | 13.8 | 1.4 |
| Example | 28 | 125 | 508 | 4.1 | 6 | 3.6 | 1135 | 13.9 | 1.4 |
| Example | 29 | 125 | 1051 | 8.4 | 5 | 1.9 | 820 | 14.1 | 0.7 |
| Comparative Example | 30 | 89 | 192 | 2.2 | <u>24</u> | 6.4 | 809 | 14.3 | 2.2 |

TABLE 5-continued

| Note | No. | Si+ | K+ | K+/Si+ | Area ratio of scale damage portion (%) | Aspect ratio of scale damage portion | Tensile strength TS (MPa) | Total elongation EL (%) | Limit bending R/t |
|---|---|---|---|---|---|---|---|---|---|
| Example | 31 | 89 | 215 | 2.6 | 14 | 5.6 | 818 | 14.7 | 1.6 |
| Example | 32 | 89 | 413 | 4.7 | 8 | 1.9 | 809 | 14.3 | 0.8 |
| Example | 33 | 89 | 355 | 4.0 | 9 | 3.2 | 818 | 14.6 | 1.3 |
| Example | 34 | 89 | 407 | 4.6 | 7 | 3.3 | 803 | 14.8 | 1.3 |
| Example | 35 | 89 | 418 | 4.7 | 8 | 3.3 | 806 | 14.0 | 1.3 |
| Example | 36 | 89 | 547 | 6.2 | 8 | 3.1 | 962 | 14.0 | 1.2 |
| Comparative Example | 37 | 171 | 369 | 2.1 | <u>24</u> | 6.3 | 1124 | 13.2 | 2.2 |
| Comparative Example | 38 | 198 | 418 | 2.1 | <u>28</u> | 6.2 | 1122 | 14.6 | 2.2 |
| Example | 39 | 117 | 419 | 3.6 | 6 | 2.7 | 844 | 13.5 | 1.4 |
| Example | 40 | 160 | 554 | 3.5 | 6 | 2.9 | 1190 | 15.7 | 1.4 |
| Example | 41 | 147 | 380 | 2.6 | 13 | 5.3 | 845 | 18.0 | 1.6 |
| Example | 42 | 141 | 388 | 2.7 | 13 | 5.3 | 842 | 17.2 | 1.6 |
| Example | 43 | 133 | 394 | 3.0 | 9 | 2.6 | 841 | 17.7 | 1.4 |
| Example | 44 | 188 | 474 | 2.5 | 11 | 2.5 | 990 | 17.7 | 1.1 |
| Example | 45 | 153 | 443 | 2.9 | 12 | 2.6 | 1210 | 14.4 | 1.3 |
| Example | 46 | 131 | 403 | 3.1 | 9 | 2.5 | 1123 | 14.7 | 1.4 |
| Example | 47 | 167 | 572 | 3.4 | 15 | 2.7 | 1268 | 14.4 | 1.4 |
| Example | 48 | 133 | 393 | 3.0 | 8 | 2.4 | 803 | 18.8 | 1.1 |
| Comparative Example | 49 | 147 | 370 | 2.5 | 14 | 5.2 | <u>760</u> | 18.2 | 1.6 |
| Comparative Example | 50 | 80 | 408 | 5.1 | 8 | 6.1 | 1135 | 13.4 | 2.5 |
| Example | 51 | 153 | 434 | 2.8 | 14 | 3.5 | 973 | 17.9 | 1.4 |
| Example | 52 | 89 | 418 | 4.7 | 8 | 2.1 | 971 | 17.2 | 0.8 |
| Comparative Example | 53 | 153 | 469 | 3.2 | <u>22</u> | 5.3 | 849 | 18.1 | 2.5 |

As shown in Tables 1 to 5, all the properties were suitable in the examples satisfying the requirements of the present invention. On the other hand, in the comparative examples in which at least one of the requirements of the present invention was not satisfied, one or more properties were not suitable.

BRIEF DESCRIPTION OF THE REFERENCE SYMBOLS

10 Scale damage portion
100 Hot-rolled steel sheet
X Rolling direction (L direction)
Y Direction (C direction) perpendicular to rolling direction
T Sheet thickness direction
I Average height position

The invention claimed is:
1. A hot-rolled steel sheet comprising, as a chemical composition, by mass %:
C: 0.030% to 0.250%;
Si: 0.40% to 2.50%;
Mn: 1.00% to 4.00%;
Sol. Al: 0.001% to 2.000%;
P: 0.100% or less;
S: 0.0200% or less;
N: 0.01000% or less;
Ti: 0% to 0.20%;
Nb: 0% to 0.20;
B: 0% to 0.010%;
V: 0% to 1.0%;
Cr: 0% to 1.0%;
Mo: 0% to 1.0%;
Cu: 0% to 1.0%;
Co: 0% to 1.0%;
W: 0% to 1.0%;
Ni: 0% to 1.0%;
Ca: 0% to 0.01%;
Mg: 0% to 0.01%;
REM: 0% to 0.01%;
Zr: 0% to 0.01%; and
a remainder comprising Fe and impurities,
wherein an area ratio of a scale damage portion, which is a portion lower than an average height of a surface of the hot-rolled steel sheet by 10 μm or more, is 5% to 20%,
a tensile strength of the hot-rolled steel sheet is 780 MPa or more,
an average aspect ratio of the scale damage portion is 1.5 to 5, and
a value of R/t, which is obtained in accordance with V-block 900 bending test in JIS Z2248, is 2.0 or less,
wherein the area ratio of the scale damage portion is measured by acquiring 3D image data of a range of 3000 μm×3000 μm on the surface of the hot-rolled steel sheet, wherein the average height position of the highest height position and the lowest height position is referred to as an average height position I, and a region having a height position lower than the average height position I by 10 μm or more is defined as a scale damage portion, and the area ratio of the scale damage portion is calculated by creating an image of a plan view of the 3D image data of the range of 3000 μm×3000 μm on the surface of the hot-rolled steel sheet viewed from above in the rolling direction and dividing the projected area of all the scale damage portions included in the range by the total projected area of the range, and wherein the aspect ratio of the scale damage portion is defined as a value A/B or B/A obtained by dividing the larger value of a length A in the rolling direction and a length B in the direction perpendicular to the rolling direction by the smaller value, wherein the length A is a length when a line segment parallel to the rolling direction is drawn to be the longest inside one scale damage portion and the length B is a length when a line segment running in the direction perpendicular to the rolling direction is drawn to be the longest inside one scale damage portion, such that the average aspect ratio is the average of all aspect ratios measured for all the scale damage portions in the range of 3000 μm×3000 μm on the surface of the hot-rolled steel sheet.

2. The hot-rolled steel sheet according to claim 1, wherein a total elongation is 18.9% or less.

3. The hot-rolled steel sheet according to claim 1, comprising at least one of, as the chemical composition, by mass %:
Ti: 0.001% to 0.20%;
Nb: 0.001% to 0.20%;
B: 0.001% to 0.010%;
V: 0.005% to 1.0%;
Cr: 0.005% to 1.0%;
Mo: 0.005% to 1.0%;
Cu: 0.005% to 1.0%;
Co: 0.005% to 1.0%;
W: 0.005% to 1.0%;
Ni: 0.005% to 1.0%;
Ca: 0.0003% to 0.01%;
Mg: 0.0003% to 0.01%;
REM: 0.0003% to 0.01%; and
Zr: 0.0003% to 0.01%.

4. The hot-rolled steel sheet according to claim 1, comprising as a chemical composition, by mass %:
Si: 1.02% to 2.50%.

5. The hot-rolled steel sheet according to claim 1, comprising as a chemical composition, by mass %:
Mn: 2.10% to 4.00%.

6. The hot-rolled steel sheet according to claim 1, comprising as a chemical composition, by mass %:
Ti: 0% to 0.03%.

7. The hot-rolled steel sheet according to claim 1, comprising as a chemical composition, by mass %:
Cr: 0.4% to 1.0%.

8. The hot-rolled steel sheet according to claim 1, comprising as a chemical composition, by mass %:
Ni: 0.8% to 1.0%.

9. The hot-rolled steel sheet according to claim 1, comprising at least one of, as a chemical composition, by mass %:
B: 0.001% to 0.010%;
Co: 0.005% to 1.0%;
W: 0.005% to 1.0%;
Mg: 0.0003% to 0.01%; and
Zr: 0.0003% to 0.01%.

10. A hot-rolled steel sheet consisting of, as a chemical composition, by mass %:
C: 0.030% to 0.250%;
Si: 0.40% to 2.50%;
Mn: 1.00% to 4.00%;
Sol. Al: 0.001% to 2.000%;
P: 0.100% or less;
S: 0.0200% or less;
N: 0.01000% or less;
Ti: 0% to 0.20%;
Nb: 0% to 0.20;
B: 0% to 0.010%;
V: 0% to 1.0%;
Mo: 0% to 1.0%;
Cu: 0% to 1.0%;
Co: 0% to 1.0%;
W: 0% to 1.0%;
Ni: 0% to 1.0%;
Ca: 0% to 0.01%;
Mg: 0% to 0.01%;
REM: 0% to 0.01%;
Zr: 0% to 0.01%; and
a remainder consisting of Fe and impurities,
wherein an area ratio of a scale damage portion, which is a portion lower than an average height of a surface of the hot-rolled steel sheet by 10 μm or more, is 5% to 20%,
a tensile strength of the hot-rolled steel sheet is 780 MPa or more,
an average aspect ratio of the scale damage portion is 1.5 to 5, and
a value of R/t, which is obtained in accordance with V-block 900 bending test in JIS Z2248, is 2.0 or less,
wherein the area ratio of the scale damage portion is measured by acquiring 3D image data of a range of 3000 μm×3000 μm on the surface of the hot-rolled steel sheet, wherein the average height position of the highest height position and the lowest height position is referred to as an average height position I, and a region having a height position lower than the average height position I by 10 μm or more is defined as a scale damage portion, and the area ratio of the scale damage portion is calculated by creating an image of a plan view of the 3D image data of the range of 3000 μm×3000 μm on the surface of the hot-rolled steel sheet viewed from above in the rolling direction and dividing the projected area of all the scale damage portions included in the range by the total projected area of the range, and
wherein the aspect ratio of the scale damage portion is defined as a value A/B or B/A obtained by dividing the larger value of a length A in the rolling direction and a length B in the direction perpendicular to the rolling direction by the smaller value, wherein the length A is a length when a line segment parallel to the rolling direction is drawn to be the longest inside one scale damage portion and the length B is a length when a line segment running in the direction perpendicular to the rolling direction is drawn to be the longest inside one scale damage portion, such that the average aspect ratio is the average of all aspect ratios measured for all the scale damage portions in the range of 3000 μm×3000 μm on the surface of the hot-rolled steel sheet.

\* \* \* \* \*